Feb. 13, 1951 A. S. HARRIS 2,541,052

DIODE COUNTER CIRCUIT

Filed Dec. 1, 1945 2 Sheets-Sheet 1

INVENTOR
ALBERT S. HARRIS

BY Edwin [illegible] Martin
ATTORNEY

Feb. 13, 1951 A. S. HARRIS 2,541,052

DIODE COUNTER CIRCUIT

Filed Dec. 1, 1945 2 Sheets-Sheet 2

INVENTOR
ALBERT S. HARRIS

BY [signature]

ATTORNEY

Patented Feb. 13, 1951 2,541,052

UNITED STATES PATENT OFFICE 2,541,052

DIODE COUNTER CIRCUIT

Albert S. Harris, Fort Wayne, Ind., assignor, by mesne assignments, to Farnsworth Research Corporation, a corporation of Indiana Application December 1, 1945, Serial No. 632,214

14 Claims. (Cl. 250—27)

Figures 1, 2, 3, 4:
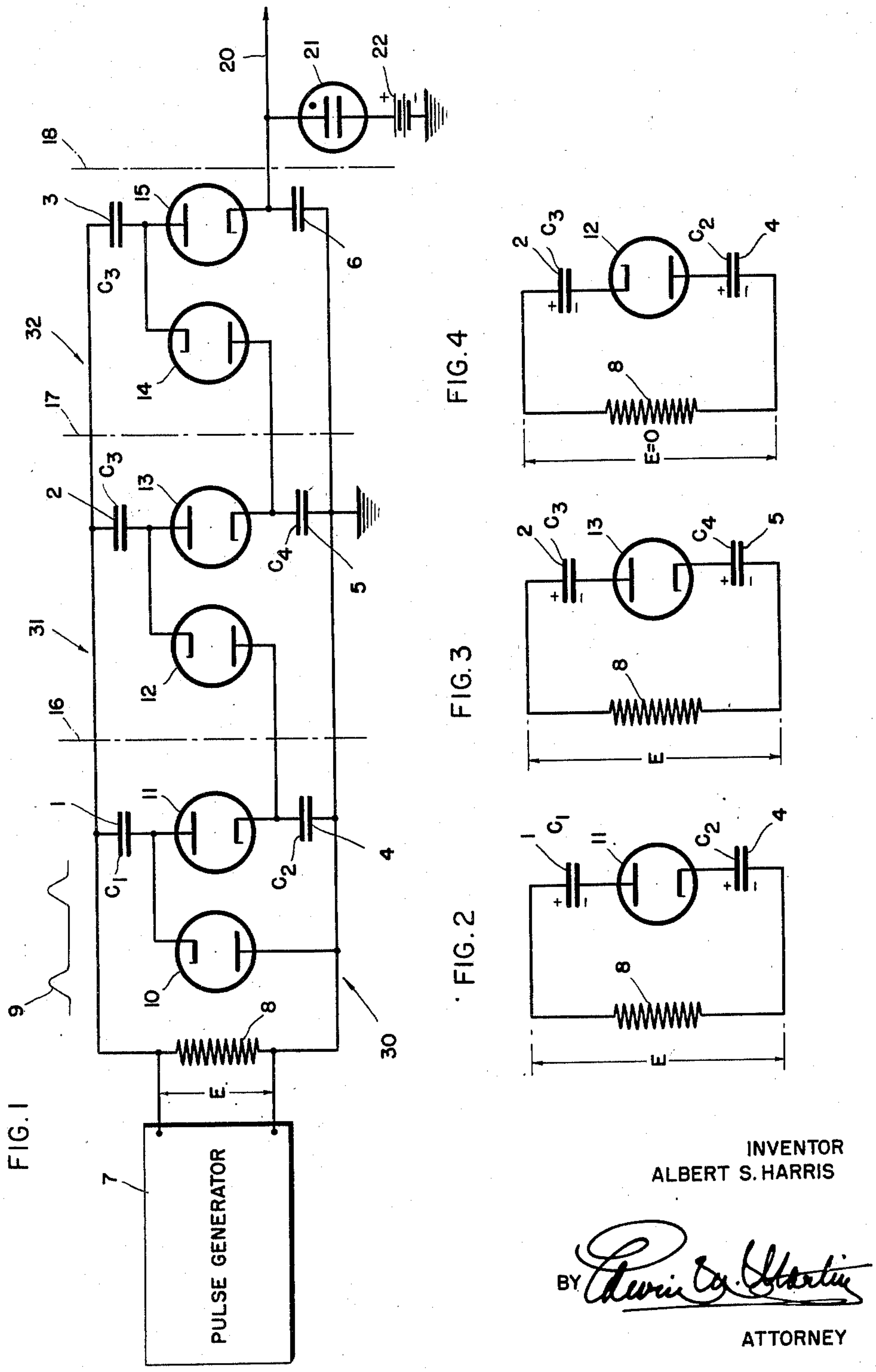

This invention relates generally to impulse responsive devices, and more particularly relates to an electric counter circuit arranged for developing an output voltage which rises by nearly equal increments in response to impulses applied to the circuit.

Electric counter circuits find wide application whenever it is desired to develop an output signal at a subharmonic of the frequency of an input signal. Counter circuits may also be used for counting electric impulses occurring at irregular intervals, such as developed in response to the radiations of radioactive materials or to cosmic radiation.

Conventional counter circuits develop an output voltage which increases in steps in response to the input pulses. However, the increments of the output voltage of prior counter circuits decrease progressively which severely limits their field of application. It is conventional practice to utilize amplitude selection for operating subsequent circuits which may include a discharge tube. Thus the individual voltage increments become increasingly smaller, and triggering of the discharge device connected to the output of the counter circuit may occur either before or after the desired number of input pulses has occurred. Accordingly, stable operation is more difficult to realize with higher counting ratios, that is, where the number of input pulses is high compared to the number of output pulses per unit of time.

A prior counter circuit comprises two inverted parallel diodes having their input connected to a charging condenser while the output of one of the diodes is connected to a storage condenser. In this counter circuit the increments of the voltage developed across the storage condenser in response to input pulses decrease rapidly. It is, therefore, very desirable to provide electric counter circuits where the increments of the output voltage are more nearly uniform than in prior circuits. The last voltage increment of the circuit should have a large amplitude to permit a higher counting ratio with stability.

It is an object of the present invention, therefore, to provide an electric counter circuit which will develop an output voltage which increases with each input pulse by nearly uniform increments.

A further object of the invention is to provide an electric counter circuit which permits a high counting ratio whereby the frequency of the input pulses is high compared to the frequency of the output pulses.

In accordance with the present invention, there is provided an electric counter comprising an electric charging element and an electric storage element. Means are provided for developing spaced pulses and means for applying the pulses to the electric elements for charging them in series substantially simultaneously with the occurrence of each of the pulses. A circuit is coupled to the charging element and includes means for developing progressively increasing potentials, the circuit being arranged to charge the charging element between successive pulses in a direction opposite to that it is charged by the pulses. In this manner the potential increments applied successively to the storage element in response to the pulses are substantially equalized. Means are further provided for discharging the storage element when it has reached a predetermined potential.

For a better understanding of the invention, together with other and further objects thereof, reference is made to the following description, taken in connection with the accompanying drawings, and its scope will be pointed out in the appended claims.

Figure 5:
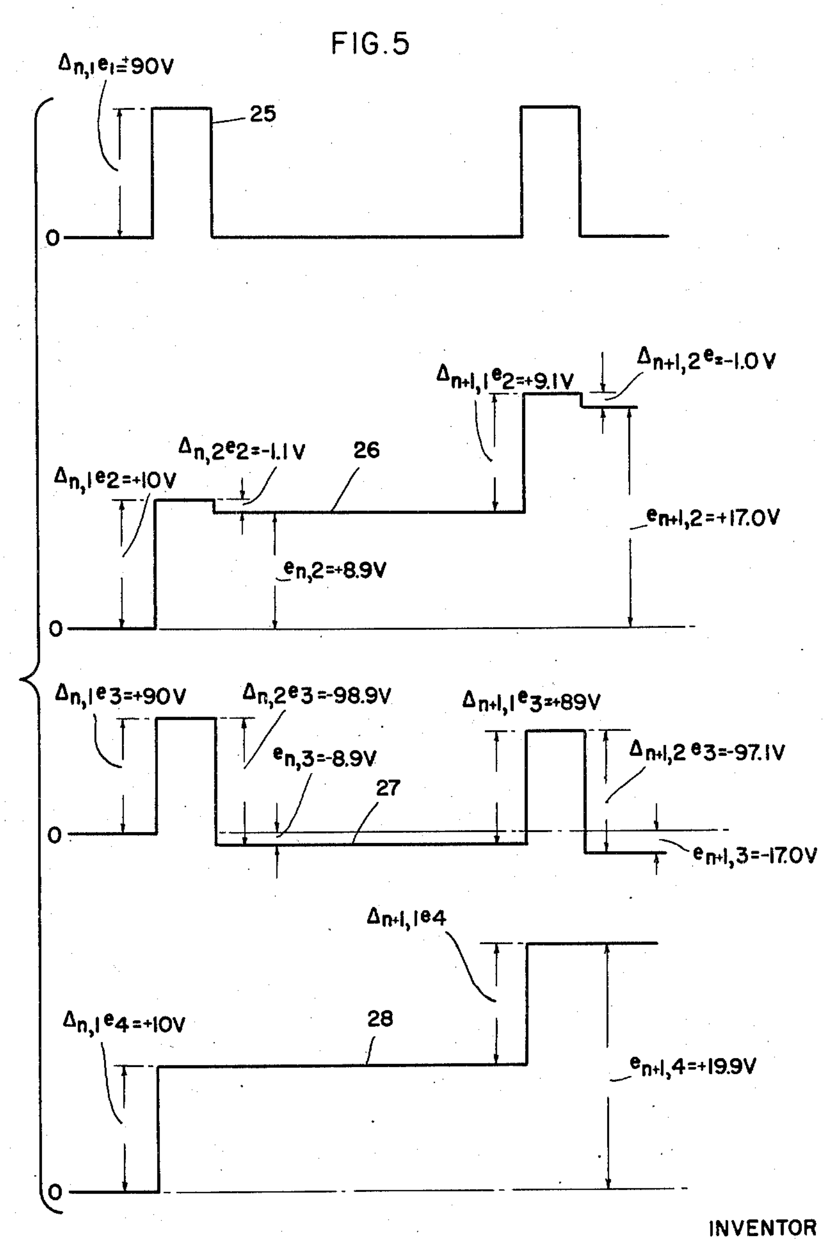

In the accompanying drawings:

Fig. 1 is a circuit diagram of an electric counter circuit embodying the present invention;

Figs. 2 to 4 are equivalent circuits of different portions of the electric counter of Fig. 1 and are referred to in explaining the invention; and Fig. 5 is a group of curves illustrating the voltages appearing across several condensers forming part of the counter circuit of Fig. 1 during a period of time corresponding to the occurrence of two successive input pulses applied to the circuit of the invention.

Referring now more particularly to Fig. 1 of the drawings, there is illustrated an electric counter circuit comprising three charging condensers 1, 2 and 3 as well as three storage condensers 4, 5 and 6. Pulse generator 7 is provided for developing spaced pulses of predetermined amplitude E. The output of pulse generator 7 is connected across resistor 8 for developing pulses of voltage E as indicated at 9. One output terminal of pulse generator 7 is connected to ground as illustrated. The other output terminal of pulse generator 7 is connected to one terminal of charging condensers 1, 2 and 3. Storage condensers 4, 5 and 6 have one terminal connected to ground and to pulse generator 7.

Charging condensers 1 to 3 and storage condensers 4 to 6 are interconnected by pairs of unilaterally conducting devices such as high vacuum diodes 10, 11, 12, 13, 14 and 15. Diode 10 has its anode connected to ground as shown and its cathode connected to the other terminal of charging condenser 1. Diode 11 is arranged between charging condenser 1 and storage condenser 4. The anode of diode 11 is connected to the cathode of diode 10. Hence, it will be seen that charging condenser 1 is connected between pulse generator 7 and the junction point of the first pair of diodes 10 and 11. Storage condenser 4 is connected between ground and the output of the first pair of diodes 10 and 11.

Similarly, charging condensers 2 and 3 are connected between one terminal of pulse generator 7 and the junction points of the second pair of diodes 12 and 13 and of the third pair of diodes 14 and 15, respectively. Storage condensers 5 and 6 are connected between ground and the output of the second pair of diodes 12 and 13 and that of the third pair of diodes 14 and 15, respectively. It will be observed that diodes 10 to 15 are connected in series to form a unilateral conducting path.

Counter circuit 30, illustrated to the left of dotted line 16 and including charging condenser 1, storage condenser 4 and diodes 10 and 11, is a conventional counter circuit. Circuit 31 arranged between dotted lines 16 and 17 includes charging condenser 2, storage condenser 5 and diodes 12 and 13. Circuit 31 is identical with circuit 32 arranged between dotted lines 17 and 18 and including charging condenser 3, storage condenser 6 and diodes 14 and 15. As will be explained more in detail hereinafter, circuit 32 illustrated between dotted lines 17 and 18 may be omitted if desired, or else a plurality of circuits such as 31 and 32 may be connected in series.

The output signal may be derived between conductor 20 and ground, conductor 20 being connected to the last storage condenser 6. A gas diode 21 connected between output conductor 20 and ground is biased by a suitable source such, for example, as battery 22. Whenever the voltage across storage condenser 6 has reached a predetermined potential with respect to ground, storage condenser 6 is discharged through gas diode 21.

The counter circuit of the invention operates as follows. It may be assumed that initially charging condensers 1 to 3 and storage condensers 4 to 6 have no charge thereon. Upon the arrival of the first input pulse developed by generator 7, charging condensers 1, 2 and 3 each receive a predetermined charge. At the same time current flows from charging condenser 1 to storage condenser 4 through diode 11, thus charging storage condenser 4. Similarly, charging condenser 2 and storage condenser 5 are connected in series through diode 13, and charging condenser 3 and the last storage condenser 6 are connected through diode 15, thereby to charge storage condensers 5 and 6.

At the end of the first pulse, charging condenser 1 is discharged through a current path including resistor 8 and diode 10. At the same time, that is after the occurrence of the first pulse, the first storage condenser 4 and the second charging condenser 2 are connected in series through diode 12. Accordingly, current flows through diode 12 until condensers 2 and 4 are discharged. Similarly, charging condenser 3 and storage condenser 5 are discharged through diode 14.

It will be observed that the current flowing through diode 12 charges charging condenser 2 in a direction opposite to the direction it is charged by the current flow resulting from input pulse 9. Accordingly, the voltage developed across charging condenser 2 due to input pulse 9 will be reversed. The same applies to the voltage of charging condenser 3 which will also be reversed. The reversed voltage across charging condensers 2 and 3 will then be added to the charging voltage E upon the occurrence of the succeeding pulse.

Thus, it will be seen that the voltages across charging condenser 2 and storage condenser 4 as well as those across charging condenser 3 and storage condenser 5 experience two changes for each charging pulse. The first change takes place in one direction during the occurrence of the pulse, while the second change takes place in the opposite direction when the condensers are discharged after the occurrence of the pulse.

For a better understanding of the operation of the counter circuit of the invention the voltage increments of the last storage condenser of the circuit will be considered quantitatively. In order to simplify the following calculations it will be assumed that circuit 32 has been omitted so that output conductor 20 is connected between storage condenser 5 and diode 13. The circuit of the invention will be compared with a conventional counter circuit which comprises circuit 30 including charging condenser 1, storage condenser 4 and diodes 10 and 11.

At first the conventional counter circuit 30 will be considered. Let it be assumed that the peak voltage of each pulse 9 equals E, while $C_1$ and $C_2$, respectively, are the capacitances of charging condenser 1 and storage condenser 4. $e_2$ is the voltage across storage condenser 4 after a predetermined number of pulses, while $\Delta_1 e_2$, $\Delta_2 e_2$, $\Delta_3 e_2$, . . . are the voltage increments of storage condenser 4 after the first pulse, the second pulse and so forth. Let it be assumed further that initially charging condenser 1 and storage condenser 4 are discharged. The first voltage increment of storage condenser 4 on the arrival of the first pulse is:

$$\Delta_1 e_2 = E\frac{C_1}{C_1+C_2}$$

As explained hereinbefore, charging condenser 1 and storage condenser 4 are connected during the occurrence of each pulse through diode 11. After the occurrence of each pulse, charging condenser 1 is discharged through resistor 8 and diode 10. Upon the arrival of the second pulse, storage condenser 4 will be charged an additional voltage increment:

$$\Delta_2 e_2 = \left(E - E\frac{C_1}{C_1+C_2}\right)\frac{C_1}{C_1+C_2} = \left(1-\frac{C_1}{C_1+C_2}\right)E\frac{C_1}{C_1+C_2}$$

After the occurrence of the second pulse, charging condenser 1 is discharged again and, upon the arrival of the third pulse, storage condenser 4 is charged an additional voltage increment:

$$\Delta_3 e_2=\left[E-E\frac{C_1}{C_1+C_2}-\left(E-E\frac{C_1}{C_1+C_2}\right)\frac{C_1}{C_1+C_2}\right]\frac{C_1}{C_1+C_2}$$
$$=[1-R-(1-R)R]ER$$
$$-(1-R)^2ER=S^2ER$$

In the above equation $$R=\frac{C_1}{C_1+C_2}$$

and $$S=1-R=1-\frac{C_1}{C_1+C_2}=\frac{C_2}{C_1+C_2}$$

so that $1-S=R$.

The total voltage across storage condenser 4 after $n$ pulses is:

$$e_2=\Delta_1 e_2+\Delta_2 e_2+\Delta_3 e_2 \ldots +\Delta_n e_2$$
$$=ER(1+S+S^2 \ldots +S^{n-1}$$
$$=ER\frac{1-S^n}{1-S}=E(1-S^n)$$
$$=E\left[1-\left(\frac{C_2}{C_1+C_2}\right)^n\right]$$

It will be seen that $$S=\frac{C_2}{C_1+C_2}$$

is always less than 1. Accordingly, successive voltage increments of charging condenser 4 will become smaller and smaller. The drawback of a conventional circuit of this type has already been explained.

The counter circuit of the invention which may include circuits 30 and 31, that is charging condensers 1, 2, storage condensers 4, 5 and diodes 10, 11, 12 and 13 is arranged so that successive voltage increments of the last storage condenser 5 decrease less rapidly. This circuit will now be considered in the same manner as the simple conventional counter circuit 30. The input signal again consists of positive pulses of peak voltage E. Let it be assumed that there is no charge on condensers 1, 2, 4 and 5 before the occurrence of the first pulse.

The voltage increments of charging condenser 1, storage condenser 4, charging condenser 2 and storage condenser 5 during the occurrence of the $n$th pulse are designated $\Delta_{n,1}e_1$, $\Delta_{n,1}e_2$, $\Delta_{n,1}e_3$, $\Delta_{n,1}e_4$, respectively. $C_1$, $C_2$, $C_3$ and $C_4$ stand, respectively, for the capacitances of charging condenser 1, storage condenser 4, charging condenser 2 and storage condenser 5. Accordingly, the voltages across the four condensers during the occurrence of the first pulse, where $n=1$, are as follows:

$$\Delta_{1,1}e_1=E\frac{C_2}{C_1+C_2} \qquad \Delta_{1,1}e_2=E\frac{C_1}{C_1+C_2}$$
$$\Delta_{1,1}e_3=E\frac{C_4}{C_3+C_4} \qquad \Delta_{1,1}e_4=E\frac{C_3}{C_3+C_4}$$

After the occurrence of the first pulse the voltage across charging condenser 1 is again reduced to zero. Furthermore, current flows between charging condenser 2 and storage condenser 4 through diode 12 until the two condensers are discharged so that the voltage across charging condenser 2 will be reversed.

For the formulae which will now be developed the following nomenclature will be used. The total voltage across storage condenser 4, charging condenser 2 and storage condenser 5 after $n$ pulses is respectively $e_{n,2}$, $e_{n,3}$ and $e_{n,4}$. The voltage increments of condensers 4, 2 and 5 during the pulse under consideration, that is the $n$th pulse, are $\Delta_{n,1}e_2$, $\Delta_{n,1}e_3$ and $\Delta_{n,2}e_4$, respectively. The voltage increments of storage condensers 4 and charging condenser 2, respectively, after the $n$th pulse under consideration are $\Delta_{n,2}e_2$ and $\Delta_{n,2}e_3$. $e_{n,1}$ does not enter into the following formulae because the voltage across charging condenser 1 is always reduced to zero after each pulse. $e_{n-1,2}$, $e_{n-1,3}$ and $e_{n-1,4}$ are the voltages across condensers 4, 2 and 5, respectively, prior to the pulse under consideration, that is after the $(n-1)$ pulse.

Referring now to Fig. 2, there is illustrated a portion of the circuit of Fig. 1 including charging condenser 1, storage condenser 4 and diode 11 connected between condensers 1 and 4. Condensers 1 and 4 are connected in parallel with resistor 8 across input voltage E. The following formula for the voltage increment of storage condenser 4 during the occurrence of the $n$th pulse may be obtained from Fig. 2.

$$\Delta_{n,1}e_2=E-e_{n-1,2}]\frac{C_1}{C_1+C_2}$$

The next two formulae may be obtained from an inspection of Fig. 3 illustrating charging condenser 2 and storage condenser 5 connected through diode 13 and arranged in parallel with resistor 8 across voltage source E:

$$\Delta_{n,1}e_3=[E-(e_{n-1,3}+e_{n-1,4})]\frac{C_4}{C_3+C_4}$$
$$\Delta_{n,1}e_4=[E-(e_{n-1,3}+e_{n-1,4})]\frac{C_3}{C_3+C_4}$$

Referring now to Fig. 4, there is illustrated still another portion of the circuit of Fig. 1 including charging condenser 2 and storage condenser 4 connected through diode 12 and arranged in parallel with resistor 8 across the voltage source E. It will be observed that $E=0$ because diode 12 is only conducting after the occurrence of a pulse when E is zero again. The following formulae may be obtained from the circuit of Fig. 4:

$$\Delta_{n,2}e_2=-(e_{n-1,2}+\Delta_{n,1}e_2+e_{n-1,3}+\Delta_{n,1}e_3)\frac{C_2}{C_2+C_3}$$
$$\Delta_{n,2}e_3=-(e_{n-1,2}+\Delta_{n,1}e_2+e_{n-1,3}+\Delta_{n,1}e_3)\frac{C_2}{C_2+C_3}$$

The voltages across storage condenser 4, charging condenser 2 and storage condenser 5 after $n$ pulses are as follows:

$$e_{n,2}=e_{n-1,2}+\Delta_{n,1}e_2+\Delta_{n,2}e_2$$
$$e_{n,3}=e_{n-1,3}+\Delta_{n,1}e_3+\Delta_{n,2}e_3$$
$$e_{n,4}=e_{n-1,4}+\Delta_{n,1}e_4$$

It can easily be shown that $e_{n,2}=-e_{n,3}$.

If this assumption is correct, the following equation holds:

$$e_{n-1,2}+\Delta_{n,1}e_2+\Delta_{n,2}e_2=-(e_{n-1,3}+\Delta_{n,1}e_3+\Delta_{n,2}e_3)$$
$$e_{n-1,2}+e_{n-1,3}+\Delta_{n,1}e_2+\Delta_{n,1}e_3=-\Delta_{n,2}e_2-\Delta_{n,2}e_3$$

By substitution we obtain:

$$e_{n-1,2}+e_{n-1,3}+\Delta_{n,1}e_2+\Delta_{n,1}e_3=(e_{n-1,2}+$$
$$\Delta_{n,1}e_2+e_{n-1,3}+\Delta_{n,1}e_3)\left(\frac{C_3}{C_2+C_3}+\frac{C_2}{C_2+C_3}\right)=$$
$$e_{n-1,2}+\Delta_{n,1}e_2+e_{n-1,3}+\Delta_{n,1}e_3$$

If $e_{n,2}=-e_{n,3}$, $e_{n-1,2}$ must also equal $-e_{n-1,3}$. Hence, after the occurrence of a pulse, the voltages across storage condenser 4 and charging condenser 2 are equal in magnitude and of opposite sign.

By assigning numerical values to E and to $C_1$, $C_2$, $C_3$ and $C_4$ or to the ratios of the capacitances, the voltages across charging condensers 1 and 2 and storage condensers 4 and 5 may be calculated. Referring now to Fig. 5, there are illustrated four curves 25, 26, 27 and 28 illustrating the voltages across charging condenser 1, storage condenser 4, charging condenser 2 and storage condenser 5, respectively, during and after the first two input pulses. In the curves of Fig. 5 the abscissa represents time, while the ordinate represents the voltage. It will be observed from the numeral values indicated in Fig. 5 in connection with the voltage increments and the total voltages across the four condensers that the four curves are not plotted to the same voltage scale. For the calculation of the curves illustrated in Fig. 5 the following assumptions have been made:

$$E=100 \text{ volts}, \frac{C_2}{C_1}=\frac{C_4}{C_3}=9 \text{ and } C_1=10C_3$$

The following table gives a comparison of the voltage increments obtained across the last storage condenser during ten consecutive input pulses of the conventional counter circuit 30 and of the counter circuit of the invention including circuits 30 and 31. The table enumerates the voltage increments obtained across storage condenser 4, when condenser 4 is the last storage condenser, as well as those across storage condenser 5. These voltage increments correspond, respectively, to $\Delta_1 e_2$, $\Delta_2 e_2$ and so forth, and to $\Delta_{n,1} e_4$. The table also lists the total voltage across storage condenser 4, assuming that this is the last storage condenser, and the total voltage $e_{n,4}$ across storage condenser 5 after $n$ input pulses.

| Number of input pulses or steps $n$ | Voltage increments of storage condenser 4 of circuit 30 | Total voltage across storage condenser 4 | Voltage increments across storage condenser 5 of circuits 30 and 31 = $\Delta_{n,1}e_4$ | Total voltage across storage condenser 5 = $e_{n,4}$ |
|---|---|---|---|---|
| 1 | 10 | 10 | 10 | 10 |
| 2 | 9 | 19 | 9.9 | 19.9 |
| 3 | 8.1 | 27.1 | 9.7 | 29.6 |
| 4 | 7.3 | 34.4 | 9.5 | 39.1 |
| 5 | 6.6 | 41.0 | 9.2 | 48.3 |
| 6 | 5.9 | 46.9 | 8.9 | 57.2 |
| 7 | 5.3 | 52.2 | 8.5 | 65.7 |
| 8 | 4.8 | 57.0 | 8.1 | 73.8 |
| 9 | 4.3 | 61.3 | 7.8 | 81.6 |
| 10 | 3.9 | 65.2 | 7.4 | 89.0 |

An inspection of the above table will show that the voltage increments $\Delta_{n,1}e_4$ across storage condenser 5 of the counter circuit of the invention, that is circuits 30 and 31, decrease much less than those of the conventional counter circuit 30. An equation of the voltage across storage condenser 5 has not been developed. However, the conditions can easily be shown which are necessary to make the voltage increments across storage condenser 5 more nearly equal. From an inspection of Fig. 1 it may be learned that if $C_2$, the capacitance of storage condenser 4, were infinitely large compared to $C_3$, the capacitance of charging condenser 2, with $$\frac{C_2}{C_1}=\frac{C_4}{C_3}$$

charging condenser 2 would become charged between successive pulses to a voltage which is equal and opposite to that across storage condenser 5. Therefore, $\Delta_{n,1}e_4$ would always be equal to $$E\frac{C_3}{C_3+C_4}$$

This follows from the above equation for $\Delta_{n,1}e_4$, where $(e_{n-1,3}+e_{n-1,4})=0$. In that case all voltage increments across storage condenser 5 would be equal.

However, the voltage increments could never increase because this would mean that storage condenser 4 would have to be charged to a voltage which is higher than that across storage condenser 5. This could not happen because in that case current would flow from storage condenser 4 to storage condenser 5 through diodes 12 and 13. Accordingly, the voltage increments may be made more nearly equal by choosing for $C_2$, the capacitance of storage condenser 4, a very much larger value than for $C_3$, the capacitance of charging condenser 2.

By adding another circuit such as circuit 32, the voltage increments across the last storage condenser, that is storage condenser 6, may be made still more nearly uniform. That this is so may easily be seen by the following consideration. After the occurrence of a pulse, the voltages across storage condenser 5 and charging condenser 3 are equal in magnitude and opposite in sign. The above table shows that the voltage increments $\Delta_{n,1}e_4$ across storage condenser 5 are very nearly uniform. Therefore, the voltage across charging condenser 3 will also increase between pulses by nearly uniform increments. Thus, the voltage increments across storage condenser 6 should be still more nearly uniform than those across storage condenser 5. It should be noted that the peak voltage to which storage condensers 4, 5 and 6 may become charged are equal to E, 2E and 3E, respectively.

When the last storage condenser, that is condenser 6 in the circuit of Fig. 1, has reached a predetermined voltage level with respect to ground, it is discharged through gas diode 21 which is biased by battery 22. At the same time storage condensers 4 and 5 are also discharged through high vacuum diodes 12 to 15, connected in series, and gas diode 21. At the same time charging condensers 2 and 3 are also discharged through high vacuum diodes 13 to 15. Charging condenser 1 is discharged after the occurrence of each pulse through diode 10. Accordingly, all condensers 1 to 3 and 4 to 6 are simultaneously discharged when charging condenser 6 has reached its predetermined voltage level.

Storage condenser 6 may be discharged by any suitable means, and it is to be understood that gas diode 21 has been shown for purposes of illustration only.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electric counter circuit comprising a first and a second charging capacitance element, a first and a second storage capacitance element, means for developing spaced pulses, means for applying said pulses to said capacitance elements to charge said first charging capacitance element and said first storage capacitance element in series and to charge said second charging capacitance element and said second storage capacitance element in series substantially simultaneously with the occurrence of each of said pulses, unilaterally conducting means coupled to said second charging capacitance element and to said first storage capacitance element for discharging them after the occurrence of each of said pulses, means for discharging said first charging capacitance element after the occurrence of each of said pulses, and means for discharging said second storage capacitance element when it has reached a predetermined voltage.

2. An electric counter circuit comprising a first and a second charging condenser, a first and a second storage condenser, the capacitance of said first charging condenser divided by the capacitance of said first storage condenser being substantially equal to the capacitance of said second charging condenser divided by the capacitance of said second storage condenser, the capacitance of said first storage condenser being large compared to the capacitance of said second charging condenser, means for developing spaced pulses of predetermined amplitude, means for applying said pulses to said condensers to charge said first charging condenser and said first storage condenser in series and to charge said second charging condenser and said second storage condenser in series substantially simultaneously with the occurrence of each of said pulses, unilaterally conducting means connected to said second charging condenser and to said first storage condenser for discharging them after the occurrence of each of said pulses, means for discharging said first charging condenser after the occurrence of each of said pulses, thereby to equalize substantially the voltage increments applied successively to said second storage condenser, and means for discharging said second storage condenser when it has reached a predetermined voltage.

3. An electric counter circuit comprising a first and a second charging capacitance element, a first and a second storage capacitance element, means for developing spaced pulses, means for applying said pulses across said capacitance elements, unilaterally conducting means for connecting in series said first charging capacitance element and said first storage capacitance element and for connecting in series said second charging capacitance element and said second storage capacitance element substantially simultaneously with the occurrence of each of said pulses, unilaterally conducting means for connecting in series said second charging capacitance element and said first storage capacitance element after the occurrence of each of said pulses, unilaterally conducting means for discharging said first charging capacitance element after the occurrence of each of said pulses, and means for discharging said second storage capacitance element when it has reached a predetermined voltage.

4. An electric counter circuit comprising a first and a second charging condenser, a first and a second storage condenser, a source for developing spaced pulses of predetermined amplitude connected between another source of fixed reference potential and one terminal of each of said charging condensers, one terminal of each of said storage condensers being connected to said source of reference potential, a first unilaterally conducting device connected between the other terminals of said first charging condenser and of said first storage condenser for charging said first storage condenser, a second unilaterally conducting device connected between said source of reference potential and the other terminal of said first charging condenser for discharging said first charging condenser after the occurrence of each of said pulses, a third unilaterally conducting device connected between the other terminals of said second storage condenser and said second charging condenser for charging said second storage condenser, a fourth unilaterally conducting device connected between the other terminals of said first storage condenser and said second charging condenser for discharging said first storage condenser and said second charging condenser after the occurrence of each of said pulses, and means for discharging said second storage condenser when it has been charged to a predetermined voltage level with respect to said reference potential.

5. An electric counter circuit comprising a first and a second charging condenser, a first and a second storage condenser, the capacitance of said first charging condenser divided by the capacitance of said first storage condenser being substantially equal to the capacitance of said second charging condenser divided by the capacitance of said second storage condenser, the capacitance of said first storage condenser being large compared to the capacitance of said second charging condenser, a source for developing spaced pulses of predetermined amplitude connected between another source of fixed reference potential and one terminal of each of said charging condensers, one terminal of each of said storage condensers being connected to said source of reference potential, a first unilaterally conducting device connected between the other terminals of said first charging condenser and of said first storage condenser for charging said first storage condenser during the occurrence of each of said pulses, a second unilaterally conducting device connected between said source of reference potential and the other terminal of said first charging condenser for discharging said first charging condenser after the occurrence of each of said pulses, a third unilaterally conducting device connected between the other terminals of said second storage condenser and said second charging condenser for charging said second storage condenser during the occurrence of each of said pulses, a fourth unilaterally conducting device connected between the other terminals of said first storage condenser and said second charging condenser for discharging said first storage condenser and said second charging condenser after the occurrence of each of said pulses, thereby to equalize substantially the voltage increments applied successively to said second storage condenser, and means for discharging said second storage condenser when it has been charged to a predetermined voltage level with respect to said reference potential.

6. An electric counter circuit comprising a first charging condenser, a source of fixed reference potential, a first diode having its cathode connected to said first charging condenser and its anode connected to said fixed reference potential, a source of second diode having its anode connected to the junction point of said first charging condenser and said first diode, a source for developing spaced pulses of predetermined amplitude having a first terminal connected to source of reference potential and a second terminal connected to said first charging condenser, a first storage condenser connected between the cathode of said second diode and said source of reference potential, pair of diodes connected in series to the cathode of said second diode to provide a unilateral conducting path, one electrode of one diode of each of said pairs of diodes being an output electrode, a plurality of further charging condensers each being connected between said source of pulses and the junction point between a different one of said pairs of diodes, a plurality of further storage condensers each being connected between said source of reference potential and the output electrode of a different one of said pairs of diodes, and means for discharging the last one of said storage condensers when it has reached a predetermined potential with respect to said reference potential.

7. An electric counter circuit comprising a first charging condenser, a source of fixed reference potential, a first high-vacuum diode having its cathode connected to said first charging condenser and its anode connected to said source of fixed reference potential, a second high-vacuum diode having its anode connected to the junction point of said first charging condenser and said first diode, a source for developing spaced pulses of predetermined amplitude having a first terminal connected to said source of reference potential and a second terminal connected to said first charging condenser, a first storage condenser connected between the cathode of said second diode and said source of reference potential, pairs of high-vacuum diodes connected in series to the cathode of said second diode to provide a unilateral conducting path, the cathode of one diode of each of said pairs of diodes being an output electrode, a plurality of further charging condensers each being connected between said source of pulses and the junction point between a different one of said pairs of diodes, a plurality of further storage condensers each being connected between said source of reference potential and the output cathode of a different one of said pairs of diodes, the capacitance of the penultimate one of said storage condensers being large compared to the capacitance of the last one of said charging condensers, the capacitance of said first charging condenser divided by the capacitance of said first storage condenser being substantially equal to the capacitance of one of said further charging condensers divided by the capacitance of its associated storage condensers connected to be charged thereby, thereby to apply substantially equal voltage increments during successive pulses to the last one of said storage condensers, and means for discharging the last one of said storage condensers when it has reached a predetermined potential with respect to said reference potential.

8. An electric counter comprising an electric charging element, a first electric storage element, means for developing spaced pulses, means for applying said pulses to said elements for charging them in series substantially simultaneously with the occurrence of each of said pulses, a circuit coupled to said charging element, a second electric storage element connected in series in said circuit, means for applying said pulses to said circuit for developing progressively increasing potentials across said second storage element, unilaterally conducting means coupled to said second storage element and to said charging element for charging said charging element between successive pulses to a polarity opposite to that to which it is charged by said pulses, and means for discharging said first storage element when it has reached a predetermined potential.

9. An electric counter comprising a charging condenser, a storage condenser, means for developing spaced pulses, means for applying said pulses to said condensers for charging them in series substantially during the occurrence of each of said pulses, a circuit, an electric storage element arranged in series in said circuit, said circuit being coupled to said charging condenser, means for applying said pulses to said element to develop potentials of successively increasing magnitude thereacross, means consisting of a unilaterally conducting device coupled to said element and to said charging condenser for charging said charging condenser between successive pulses to a polarity opposite to that to which it is charged by said pulses, and means for discharging said storage condenser when it has been charged to a predetermined potential.

10. An electric counter circuit comprising a source of fixed reference potential, a source for developing spaced pulses, said pulse source having a first terminal connected to said source of reference potential and a second terminal, two pairs of diodes connected in series to form a unilateral conducting path, one electrode of one diode of each of said pairs of diodes being an output electrode, the first one of said diodes being connected with its anode to the first terminal of said source of pulses, two charging capacitance elements, each being connected between the second terminal of said source of pulses and the junction point between a different pair of said diodes, two storage capacitance elements each being connected between said source of reference potential and the output electrode of a different pair of said diodes, and means for discharging the last one of said storage capacitance elements when it has reached a predetermined voltage with respect to said reference potential.

11. An electric counter circuit comprising a source of fixed reference potential, a source for developing spaced pulses of predetermined amplitude, said pulse source having a first terminal connected to said source of reference potential and a second terminal, two pairs of diodes connected in series to form a unilateral conducting path, one electrode of one diode of each of said pairs of diodes being an output electrode, the first one of said diodes being connected with its anode to the first terminal of said source of pulses, a first charging condenser connected between the second terminal of said source of pulses and the junction point between one pair of said diodes, a second charging condenser connected between the second terminal of said source of pulses and the junction point between the other pair of said diodes, a first and a second storage condenser each being connected between said source of reference potential and the output electrode of a different pair of said diodes, the capacitance of said first charging condenser divided between capacitance of said first storage condenser being substantially equal to the capacitance of said second charging condenser divided by the capacitance of said second storage condenser, the capacitance of said first storage condenser being large compared to the capacitance of said second charging condenser, thereby to equalize substantially the voltage increments supplied successively to said second storage condenser, and means for discharging said second storage condenser when it has reached a predetermined voltage with respect to said reference potential.

12. An electric counter circuit comprising a source of fixed reference potential, a source for developing spaced pulses, said pulse source having a first terminal connected to said source of reference potential and a second terminal, pairs of unilaterally conducting devices connected in series, one electrode of one unilaterally conducting device of each of said pairs of unilaterally conducting devices being an output electrode, the first one of said devices being connected to the first terminal of said source of pulses, charging capacitance elements each being connected between the second terminal of said source of pulses and the junction point between a different pair of said devices, storage capacitance elements each being connected between said source of reference potential and the output electrode of a different pairs of said devices, and means for discharging the last one of said storage capacitance elements when it has reached a predetermined voltage with respect to said reference potential.

13. An electric counter circuit comprising a source of fixed reference potential, a source for developing spaced pulses of predetermined amplitude, said pulse source having a first terminal connected to said source of reference potential and a second terminal, pairs of diodes connected in series to form a unilateral conducting path, one electrode of one diode of each of said pairs of diodes being an output electrode, the first one of said diodes being connected with its anode to the first terminal of said source of pulses, charging condensers each being connected between the second terminal of said source of pulses and the junction point between a different pair of said diodes, storage condensers each being connected between said source of reference potential and the output electrode of a different pair of said diodes, and means for discharging the last one of said storage condensers when it has reached a predetermined voltage with respect to said reference potential.

14. An electric counter circuit comprising a source of fixed reference potential, a source for developing spaced pulses of predetermined amplitude, said pulses source having a first terminal connected to said source of reference potential and a second terminal, pairs of diodes connected in series to form a unilateral conducting path, one electrode of one diode of each of said pairs of diodes being an output electrode, the first one of said diodes being connected with its anode to the first terminal of said source of pulses, charging condensers each being connected between the second terminal of said source of pulses and the junction point between a different pair of said diodes, storage condensers each being connected between said source of reference potential and the output electrode of a different pair of said diodes, the capacitance of the penultimate one of said storage condensers being large compared to the capacitance of the last one of said charging condensers, the capacitance of one of said charging condensers divided between capacitance of its associated storage condenser connected to be charged thereby being substantially equal to the capacitance of another one of said charging condensers divided by the capacitance of its associated storage condenser connected to be charged thereby, thereby to apply substantially equal voltage increments during successive pulses to the last one of said storage condensers, and means for discharging the last one of said storage condensers when it has reached a predetermined voltage with respect to said reference potential.

ALBERT S. HARRIS.

REFERENCES CITED

The following references are of record in the file of this patent:

UNITED STATES PATENTS

| Number | Name | Date |
|---|---|---|
| 2,420,516 | Bischoff | May 13, 1942 |
| 2,403,557 | Sanders | July 9, 1946 |